United States Patent
Huang

(10) Patent No.: US 11,462,372 B2
(45) Date of Patent: Oct. 4, 2022

(54) ILLUMINATED KEYBOARD INCLUDING A FEEDBACK WIRE FOR DIFFERENTIATING KEY PRESSES, AND CONTROL METHOD THEREOF

(71) Applicant: Anapex Technology Inc., Hsinchu County (TW)

(72) Inventor: Tsung-Wen Huang, Hsinchu County (TW)

(73) Assignee: ANAPEX TECHNOLOGY INC., Jhubei (TW)

( * ) Notice: Subject to any disclaimer, the term of this patent is extended or adjusted under 35 U.S.C. 154(b) by 0 days.

(21) Appl. No.: 17/107,332

(22) Filed: Nov. 30, 2020

(65) Prior Publication Data

US 2021/0304983 A1    Sep. 30, 2021

(30) Foreign Application Priority Data

Mar. 25, 2020 (TW) .................. 109110061

(51) Int. Cl.
*H01H 13/83* (2006.01)
*H01H 9/16* (2006.01)
*G06F 3/02* (2006.01)
*G06F 1/16* (2006.01)

(52) U.S. Cl.
CPC .......... *H01H 13/83* (2013.01); *G06F 1/1662* (2013.01); *G06F 3/0202* (2013.01); *H01H 9/161* (2013.01); *H01H 2009/164* (2013.01)

(58) Field of Classification Search
None
See application file for complete search history.

(56) References Cited

U.S. PATENT DOCUMENTS

| 4,234,872 A | * | 11/1980 | Halder | G09G 3/001 341/26 |
| 2012/0013272 A1 | * | 1/2012 | Huang | G06F 3/0202 315/312 |
| 2014/0176352 A1 | * | 6/2014 | Hussain | H01H 13/83 341/26 |

FOREIGN PATENT DOCUMENTS

| CN | 203071916 U | * | 7/2013 |
| TW | M482920 | | 7/2014 |

* cited by examiner

*Primary Examiner* — Kirk W Hermann
(74) *Attorney, Agent, or Firm* — Muncy, Geissler, Olds & Lowe, P.C.

(57) ABSTRACT

An illuminated keyboard includes a light-emitting diode light string, a controller, a feedback line and a plurality of keys. The light-emitting diode light string includes a plurality of light-emitting diode modules which are connected in series through a serial connection wire. Each light-emitting diode module includes a light-emitting diode chip and a drive circuit. The controller is electrically connected with the light-emitting diode light string. The feedback line is electrically connected between the light-emitting diode modules and the controller. The keys correspond to the light-emitting diode modules and are electrically connected with the feedback line. Each light-emitting diode module emits light according to a received light-emitting signal and outputs a feedback signal. When at least one of the keys is switched to a pressing state, the feedback signal is pulled from a first level to a second level for the controller to differentiate the key in the pressing state.

7 Claims, 4 Drawing Sheets

ILLUMINATED KEYBOARD INCLUDING A FEEDBACK WIRE FOR DIFFERENTIATING KEY PRESSES, AND CONTROL METHOD THEREOF

FIELD OF THE INVENTION

The present invention relates to an illuminated keyboard and a control method thereof, in particular to an illuminated keyboard with light-emitting diodes connected in series through a single wire and a control method for the illuminated keyboard.

BACKGROUND OF THE INVENTION

Based on the demands of consumers, more and more keyboards are configured with a light emitting function, wherein some keyboards are for decorative purposes, and some keyboards aim at providing a function of illumination or prompt. With changes of the market trend, the proportion of the illuminated keyboards (or backlight keyboards) in the keyboard market rises gradually, and the illuminated keyboards even become one of standard accessories of computers.

Conventional illuminated keyboards can be found in R.O.C. Utility Model Patent No. M482920, which discloses a flexible circuit board applied to a keyboard backlight module, the flexible circuit board includes a backlight module. The backlight module includes a light guide plate and is provided with a flexible circuit board on the surface of one side of the light guide plate, a plurality of holes are formed in the light guide plate at an interval in a staggered manner. The surface of the flexible circuit board is provided with a plurality of light-emitting diodes in a single row and one light-emitting direction, one side of the flexible circuit board is folded and overlapped to form a bent portion, and the other side of the flexible circuit board is folded and overlapped to form another bent portion so as to provide the plurality of light-emitting diodes for arrangement side by side and emit light in different directions to extend into the holes, respectively.

Conventional illuminated keyboards usually need to be coordinated with pressing of the keys and the light-emitting diodes for more than two groups of independent circuit layout, wherein some illuminated keyboards adopt multi-layer circuit boards, and some illuminated keyboards adopt single-layer circuit boards. The former is high in cost due to more layer numbers of the circuit boards, and the latter with the single-layer circuit board also has the problem of high cost due to relatively complex circuit layout. Furthermore, it needs more pins for inputting and outputting of signals with existence of the two groups of independent circuit layout.

SUMMARY OF THE INVENTION

A main objective of the present invention is to solve the problem of high manufacturing cost due to complex circuit layout of the conventional illuminated keyboards.

To achieve the foregoing objective, the present invention provides an illuminated keyboard, including a light-emitting diode light string, a controller, a feedback line and a plurality of keys, wherein the light-emitting diode light string includes a plurality of light-emitting diode modules which are connected in series with each other through a serial connection wire, each of the light-emitting diode modules includes a light-emitting diode chip, a drive circuit, an input terminal, an output terminal and a feedback terminal, and the drive circuit, the input terminal, the output terminal and the feedback terminal are electrically connected with the corresponding light-emitting diode chip; the controller is electrically connected with the light-emitting diode light string through the serial connection wire; the feedback line is electrically connected between the light-emitting diode modules and the controller and includes a plurality of feedback wires electrically connected to the feedback terminals of the corresponding light-emitting diode modules respectively and a common wire electrically connected between the feedback wires and the controller; the plurality of keys correspond to the light-emitting diode modules and are electrically connected to the feedback wires respectively; and each key has a pressing state and a non-pressing state, each light-emitting diode module emits light according to a light-emitting signal after receiving the light-emitting signal, outputs a feedback signal and transfers the feedback signal to the controller through the feedback wires respectively, and when at least one of the keys is switched to the pressing state from the non-pressing state, the feedback signal is pulled from a first level up to a second level for the controller to differentiate the key in the pressing state.

To achieve the foregoing objective, the present invention further provides a control method for the illuminated keyboard, applied to the illuminated keyboard. The illuminated keyboard includes a light-emitting diode light string, a controller, a feedback line and a plurality of keys; the light-emitting diode light string includes a plurality of light-emitting diode modules which are connected in series with each other through a serial connection wire; the controller is electrically connected with the light-emitting diode light string through the serial connection wire; the feedback line is electrically connected between the light-emitting diode modules and the controller; and the keys correspond to the light-emitting diode modules and are electrically connected to the feedback line, wherein each key has a pressing state and a non-pressing state. The control method includes the following steps that: step 1, the controller transfers a light-emitting signal to the light-emitting diode light string through the serial connection wire; step 2, each light-emitting diode module of the light-emitting diode light string emits light according to the light-emitting signal after receiving the light-emitting signal, outputs a feedback signal and transfers the feedback signal to the controller through the feedback line; and step 3, when at least one of the keys is switched to the pressing state from the non-pressing state, the feedback signal is pulled from a first level up to a second level for the controller to differentiate the key in the pressing state.

To achieve the foregoing objective, the present invention further provides a control method for the illuminated keyboard, applied to the illuminated keyboard. The illuminated keyboard includes a light-emitting diode light string, a controller, a feedback line and a plurality of keys; the light-emitting diode light string includes a plurality of light-emitting diode modules which are connected in series with each other through a serial connection wire; the controller is electrically connected with the light-emitting diode light string through the serial connection wire; the feedback line is electrically connected between the light-emitting diode modules and the controller; and the keys correspond to the light-emitting diode modules and are electrically connected to the feedback line, wherein each key has a pressing state and a non-pressing state. The control method includes the following steps that: step 1, the controller transfers a light-emitting signal and a discriminating signal to the light-emitting diode light string through the serial connection wire, wherein the light-emitting signal is not be equivalent to the discriminating signal; step 2, each light-emitting diode module of the light-emitting diode light string emits light according to the light-emitting signal after receiving the light-emitting signal; step 3, each light-emitting diode module of the light-emitting diode light string outputs a feedback signal after receiving the discriminating signal and transfers the feedback signal to the controller through the feedback line; and step 4, when at least one of the keys is switched to the pressing state from the non-pressing state, the feedback signal is pulled from a first level up to a second level for the controller to differentiate the key in the pressing state.

Circuit layout according to the illuminated keyboard of the present invention needs a single-layer circuit board only without adopting a multi-layer circuit board, and a hardware only needs to be additionally provided with the feedback line in coordination with a signal detection manner since the plurality of light-emitting diode modules connected in series through a single wire, so that the illuminated keyboard with a simple and convenient line architecture is provided; and according to the present invention, except relatively simple circuit layout, the feedback terminals need to be added in addition to the input terminals and the output terminals of the light-emitting diode modules, such that the purpose of controlling the production cost is achieved.

DETAILED DESCRIPTION OF THE PREFERRED EMBODIMENTS

The detailed description and technical content of the present invention are described below with reference to the accompanying drawings.

Figure 1:
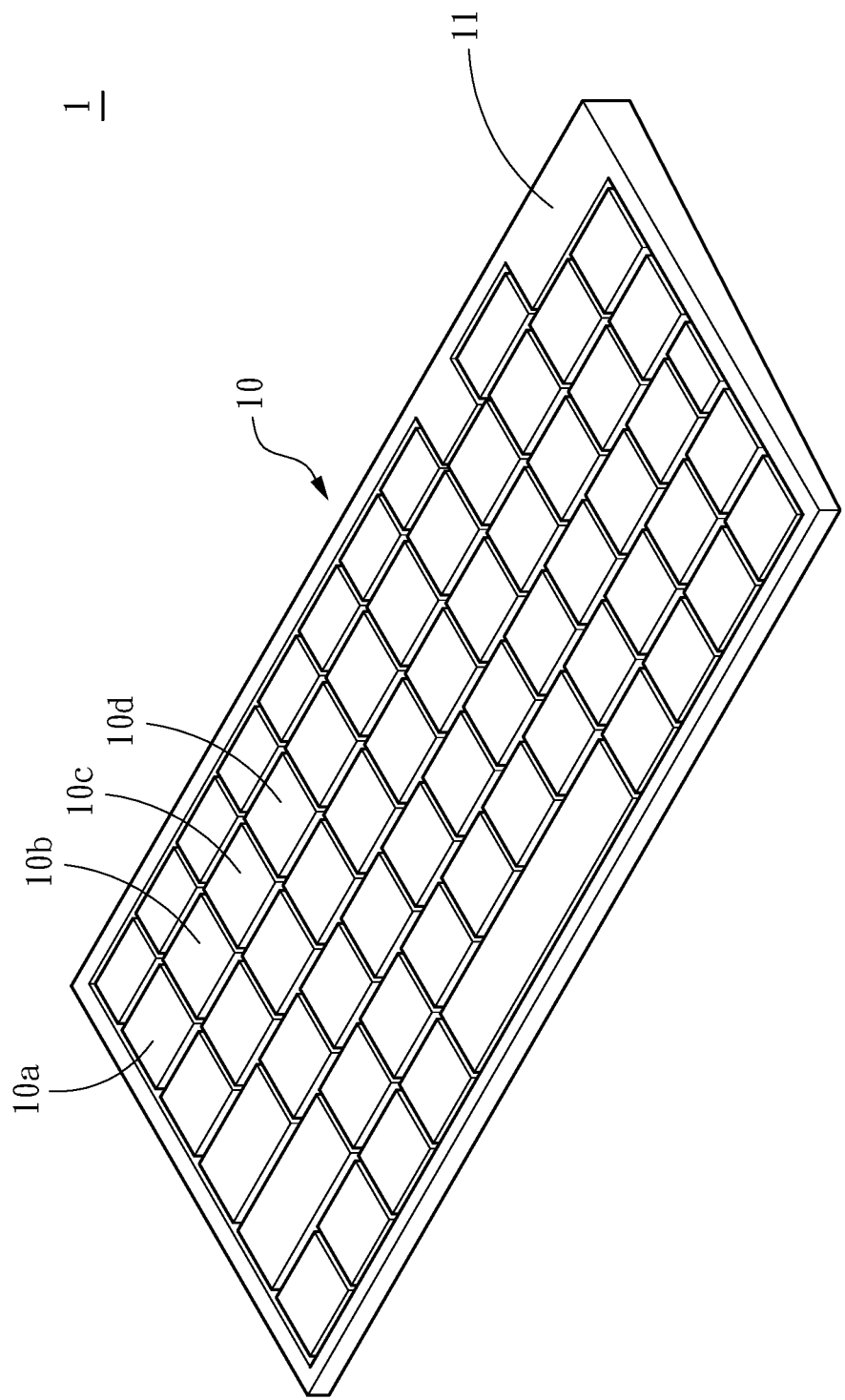
FIG. 1 schematically shows a three-dimensional outside diagram of one embodiment of the present invention.
Figure 2:
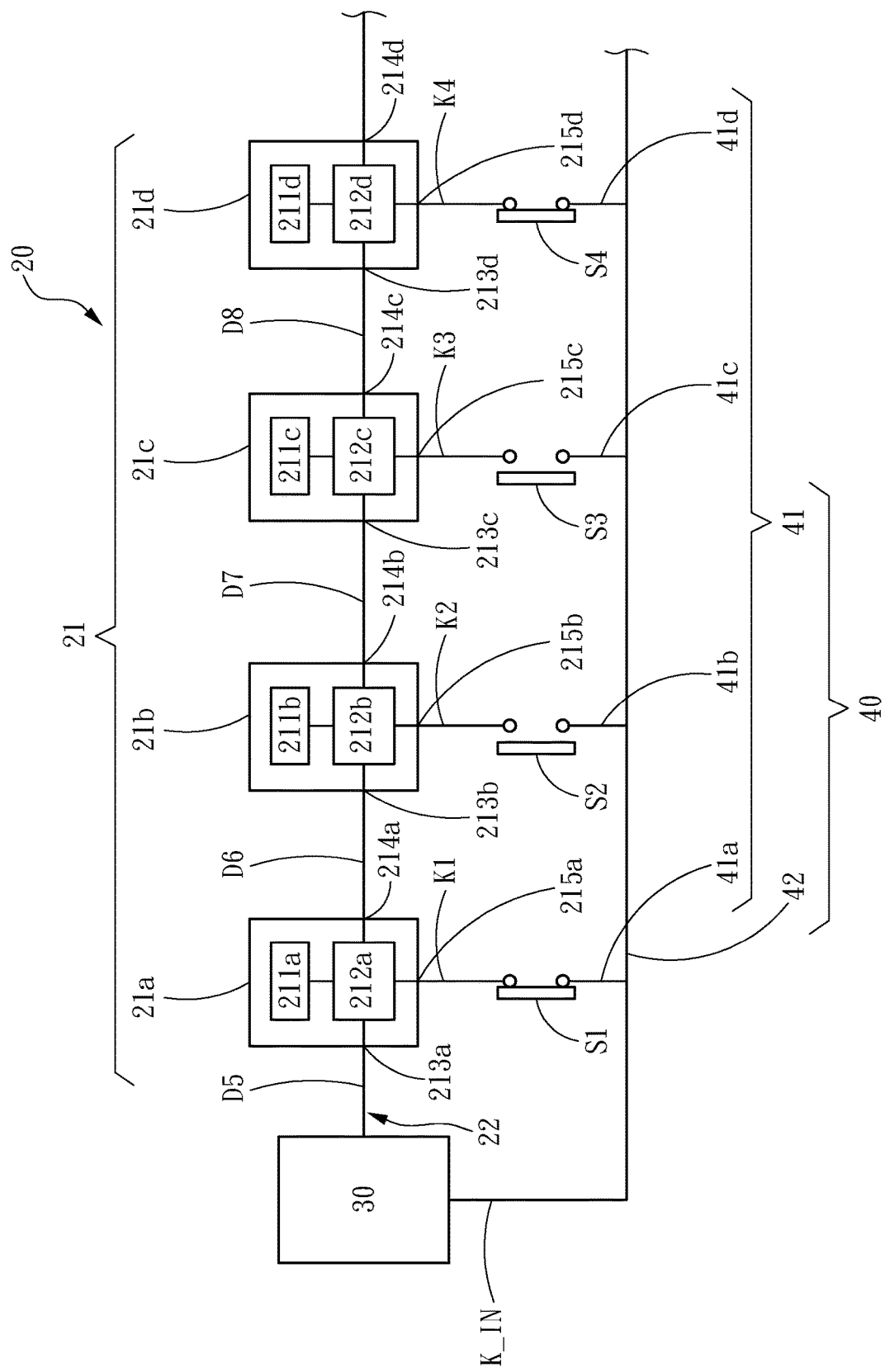
FIG. 2 schematically shows a diagram of a circuit architecture of one embodiment of the present invention.

Referring to FIG. 1 and FIG. 2 which are a three-dimensional outside diagram and a diagram of the circuit architecture of one embodiment of the present invention respectively, the embodiment of the present invention discloses an illuminated keyboard 1 including a plurality of keys 10, a light-emitting diode light string 20, a controller 30 and a feedback line 40. The keys 10 are installed on a base 11, and the light-emitting diode light string 20, the controller 30 and the feedback line 40 are also arranged on the base 11. The preceding descriptions are intended to be illustrative, and these elements may also adopt other assembly manners according to the actual use and the manufacturing demands.

As shown in FIG. 2, the light-emitting diode light string 20 includes a plurality of light-emitting diode modules 21 which are connected with each other through a serial connection wire 22, the plurality of light-emitting diode modules 21 include a first light-emitting diode module 21a, a second light-emitting diode module 21b, a third light-emitting diode module 21c and a fourth light-emitting diode module 21d, each of which includes a light-emitting diode chip 211a, 211b, 211c, 211d, a drive circuit 212a, 212b, 212c, 212d, an input terminal 213a, 213b, 213c, 213d, an output terminal 214a, 214b, 214c, 214d and a feedback terminal 215a, 215b, 215c, 215d. Wherein the light-emitting diode chip 211a, 211b, 211c, 211d, the input terminals 213a, 213b, 213c, 213d, the output terminals 214a, 214b, 214c, 214d and the feedback terminal 215a, 215b, 215c, 215d are electrically connected with the drive circuit 212a, 212b, 212c, 212d, and the controller 30 is electrically connected with the light-emitting diode light string 20 through the serial connection wire 22.

The feedback line 40 is electrically connected between the light-emitting diode modules 21 and the controller 30, the feedback line 40 includes a plurality of feedback wires 41 and a common wire 42, and the plurality of keys 10 correspond to the plurality of light-emitting diode modules 21 and are electrically connected to the plurality of feedback wires 41. In the embodiment of the present invention, the plurality of feedback wires 41 correspond to the plurality of light-emitting diode modules 21 and include a first feedback wire 41a, a second feedback wire 41b, a third feedback wire 41c and a fourth feedback wire 41d. The first feedback wire 41a, the second feedback wire 41b, the third feedback wire 41c and the fourth feedback wire 41d are electrically connected between the feedback terminal 215a, 215b, 215c, 215d and the common wire 42. The common wire 42 is electrically connected between the plurality of feedback wires 41 and the controller 30. Each of the plurality of keys 10 includes a pressing state and a non-pressing state. In the embodiment of the present invention, a switch is formed between each of the plurality of keys 10 and each of the plurality of feedback wires 41, the switch is turned on when the corresponding key 10 is in the pressing state, and the switch is turned off when the corresponding key 10 is in the non-pressing state.

In one embodiment of the present invention, the controller 30 outputs a light-emitting signal to the plurality of light-emitting diode modules 21 during operation, and the drive circuit 212a, 212b, 212c, 212d receives the light-emitting signal through the input terminals 213a, 213b, 213c and 213d and drives the light-emitting diode chip 211a, 211b, 211c, 211d to emit light according to the light-emitting signal, and the drive circuit 212a, 212b, 212c, 212d transmits the light-emitting signal to the next one of the plurality of light-emitting diode modules 21 through the output terminals 214a, 214b, 214c, 214d and further outputs a feedback signal to the controller 30 through the feedback terminal 215a, 215b, 215c, 215d. According to the design of the embodiment of the present invention, a normal condition of the feedback terminal 215a, 215b, 215c, 215d of each of the plurality of light-emitting diode modules 21 (when not receiving the light-emitting signal) is a high level state, and the feedback terminal 215a, 215b, 215 c, 215d outputs a low level after the drive circuit 212a, 212b, 212c, 212d receiving the light-emitting signal. In another aspect, the plurality of feedback wires 41 are disconnected when the plurality of keys 10 are in the non-pressing state, and the corresponding feedback wires 41 are connected when the plurality of keys 10 are in the pressing state such that the controller 30 receives the low level. In other words, the plurality of feedback wires 41 are connected if a user presses the plurality of keys 10, the feedback signal is pulled from a first level to a second level, and therefore, the controller 30 differentiates the plurality of keys 10 in the pressing state according to the second level. In the embodiment of the present invention, the second level corresponds to the low level.

Figure 3:
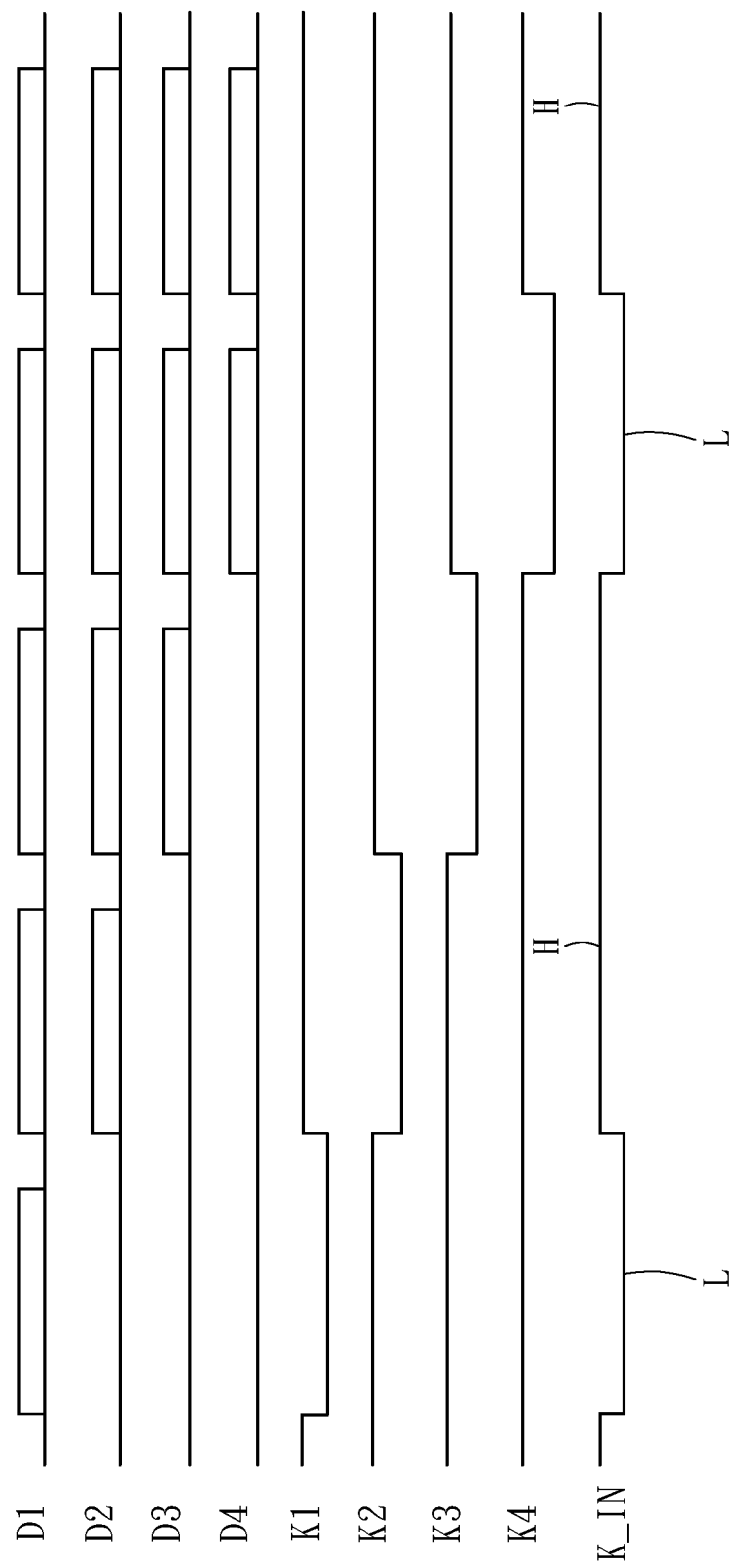
FIG. 3 schematically shows a voltage-time diagram of one embodiment of the present invention.

Referring to FIG. 1, in the embodiment of the present invention, the plurality of keys 10 include a first key 10a, a second key 10b, a third key 10c and a fourth key 10d corresponding to the first light-emitting diode module 21a, the second light-emitting diode module 21b, the third light-emitting diode module 21c and the fourth light-emitting diode module 21d, respectively. Referring to FIG. 2, the first key 10a, the second key 10b, the third key 10c, the fourth key 10d and the first feedback wire 41a, the second feedback wire 41b, the third feedback wire 41c, the fourth feedback wire 41d correspond to a first switch S1, a second switch S2, a third switch S3 and a fourth switch S4, respectively. Referring to FIG. 3 which is a voltage-time diagram of one embodiment of the present invention, D1 is the light-emitting signal received by the first light-emitting diode module 21a, D2 is the light-emitting signal received by the second light-emitting diode module 21b, D3 is the light-emitting signal received by the third light-emitting diode module 21c, and D4 is the light-emitting signal received by the fourth light-emitting diode module 21d. In the embodiment of the present invention, D1, D2, D3 and D4 are instructions with bit lengths which are 24 bits, and D1, D2, D3 and D4 perform key scan while transmitting instructions with bit lengths which are 24 bits. In other embodiments of the present invention, instructions with other bit lengths are also adopted. K1 is the feedback signal outputted by the first light-emitting diode module 21a, K2 is the feedback signal outputted by the second light-emitting diode module 21b, K3 is the feedback signal outputted by the third light-emitting diode module 21c, and K4 is the feedback signal outputted by the fourth light-emitting diode module 21d. K_IN is a signal received by the controller 30. The normal condition of the feedback terminal 215a, 215b, 215c, 215d of each of the plurality of light-emitting diode modules 21 is a high level H, and the feedback terminal 215a, 215b, 215c, 215d outputs a low level L after the drive circuit 212a, 212b, 212c, 212d receiving the light-emitting signal, as shown in FIG. 3. The first switch S1 and the fourth switch S4 are turned on when the first key 10a and the fourth key 10d are pressed, such that the controller 30 receives the low level L outputted by the first light-emitting diode module 21a and the fourth light-emitting diode module 21d, and the controller 30 determines that the pressed keys belong to which one of the first key 10a and the fourth key 10d in the plurality of keys 10 according to a time that the low level L is received, so as to coordinate with a computer for executing instructions.

Figure 4:
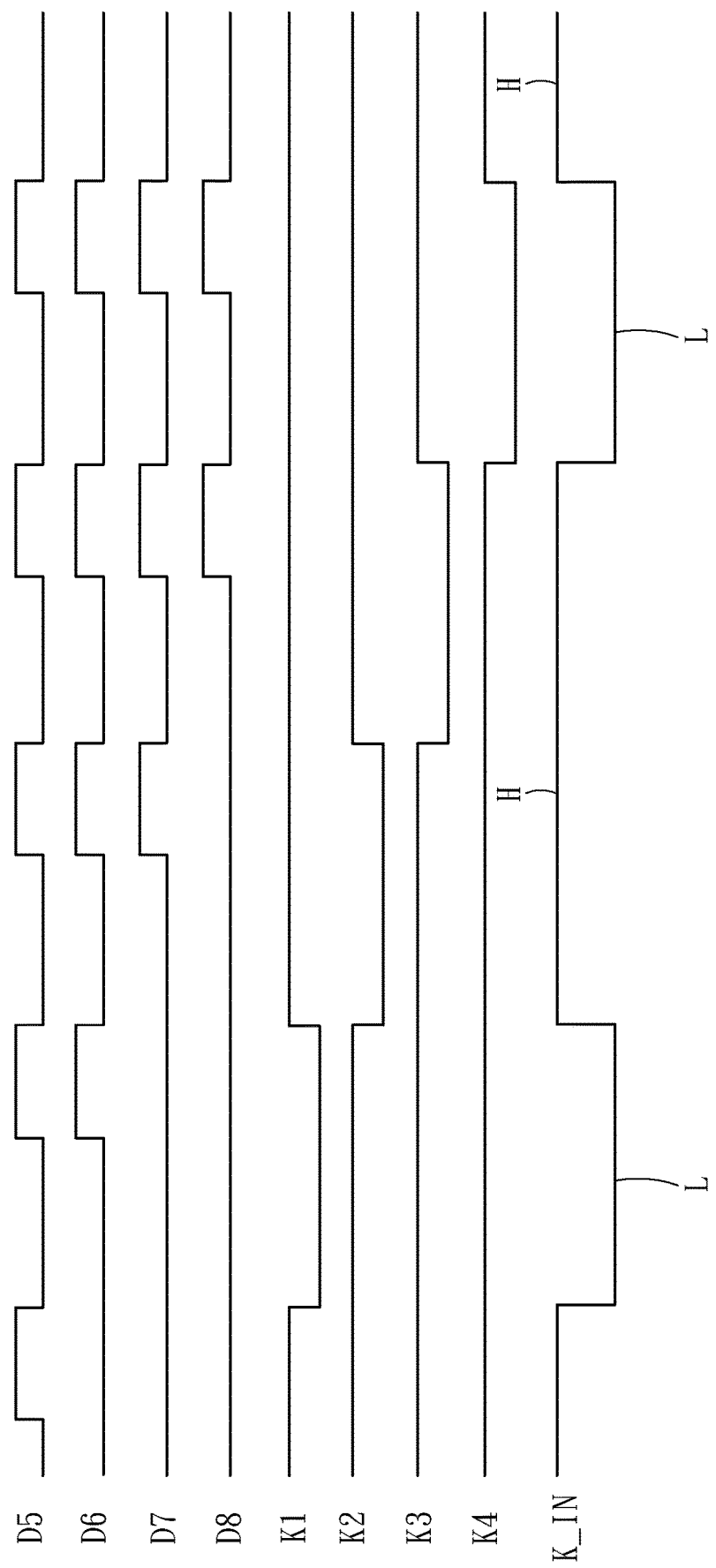
FIG. 4 schematically shows a voltage-time diagram of another embodiment of the present invention.

In another embodiment of the present invention, the controller 30 transmits a light-emitting signal and a discriminating signal to the light-emitting diode light string 20 through the serial connection wire 22, and the light-emitting signal is not equivalent to the discriminating signal. In the embodiment of the present invention, the light-emitting signal and the discriminating signal are electric signals with different pulse widths. In other words, different pulse widths are provided for the light-emitting diode light string 20 to distinguish the light-emitting signal from the discriminating signal. Referring to FIG. 4 which is the voltage-time diagram of another embodiment of the present invention, as shown in FIG. 4, D5 is the discriminating signal received by the first light-emitting diode module 21a, D6 is the discriminating signal received by the second light-emitting diode module 21b, D7 is the discriminating signal received by the third light-emitting diode module 21c, and D8 is the discriminating signal received by the fourth light-emitting diode module 21d. D5, D6, D7 and D8 perform key scan by transmitting pulses with a fixed frequency. K1 is the feedback signal outputted by the first light-emitting diode module 21a, K2 is the feedback signal outputted by the second light-emitting diode module 21b, K3 is the feedback signal outputted by the third light-emitting diode module 21c, and K4 is the feedback signal outputted by the fourth light-emitting diode module 21d. K_IN is a signal received by the controller 30. The normal condition of the feedback terminal 215a, 215b, 215c, 215d of each of the plurality of light-emitting diode modules 21 is a high level H, and the feedback terminal 215a, 215b, 215c, 215d outputs a low level L after the drive circuit 212a, 212b, 212c, 212d receiving and waiting the discriminating signal to be finished, as shown in FIG. 4. The first key 10a and the fourth key 10d are pressed, and the first switch S1 and the fourth switch S4 are turned on, such that the controller 30 receives the low level L outputted by the first light-emitting diode module 21a and the fourth light-emitting diode module 21d so that the controller 30 determines the pressed keys belong to the first key 10a and the fourth key 10d according to the time that the low level L is received, so as to coordinate with the computer for executing the instructions.

Circuit layout of the illuminated keyboard 1 disclosed in the present invention which only needs a single-layer circuit board without adopting a multi-layer circuit board, and a hardware only needs to be additionally provided with the feedback line 40 in coordination with a signal detection manner since the plurality of light-emitting diode modules 21 connected in series through a single wire, so that the illuminated keyboard 1 with a simple and convenient line architecture is provided. Except relatively simple circuit layout, the present invention disclosed that the feedback terminal 215a, 215b, 215c, 215d only needs to be added, in addition to the input terminal 213a, 213b, 213c, 213d and the output terminal 214a, 214b, 214c, 214d of the plurality of light-emitting diode modules 21, such that the purpose of controlling the production cost is achieved.

What is claimed is:

1. An illuminated keyboard including a feedback wire for differentiating key presses, comprising:
    a light-emitting diode light string, comprising a plurality of light-emitting diode modules which are connected in series with each other through a serial connection wire, wherein each of the light-emitting diode modules comprises a light-emitting diode chip, a drive circuit, an input terminal, an output terminal and a feedback terminal, and the drive circuits, and the input terminals, the output terminals and the feedback terminals are electrically connected with the light-emitting diode chips, respectively;
    a controller, electrically connected with the light-emitting diode light string through the serial connection wire;
    a feedback line, electrically connected between the plurality of light-emitting diode modules and the controller and comprising a plurality of feedback wires which are electrically connected to the plurality of feedback terminals of the corresponding light-emitting diode modules respectively and a common wire which is electrically connected between the plurality of feedback wires and the controller; and
    a plurality of keys, corresponding to the light-emitting diode modules and electrically connected to the plurality of feedback wires,
    wherein each of the plurality of keys comprises a pressing state and a non-pressing state, each of the plurality of light-emitting diode modules emits light according to a light-emitting signal after receiving the light-emitting signal, outputs a feedback signal and transfers the feedback signal to the controller through the corresponding feedback wire, and when at least one of the keys is switched to the pressing state from the non-pressing state, a corresponding feedback signal is pulled from a first level to a second level for the controller to differentiate the key in the pressing state.

2. The illuminated keyboard of claim 1, wherein the controller differentiates the key in the pressing state according to a time receiving the corresponding feedback signal.

3. The illuminated keyboard of claim 1, wherein a switch is formed between the key and the feedback wire, and the switch is turned on when the key is in the pressing state and is turned off when the key is in the non-pressing state.

4. A control method for an illuminated keyboard including a feedback wire for differentiating key presses, which is applied to the illuminated keyboard, wherein the illuminated keyboard comprises a light-emitting diode light string, a controller, a feedback line and a plurality of keys; the light-emitting diode light string comprises a plurality of light-emitting diode modules which are connected in series with each other through a serial connection wire, the controller is electrically connected with the light-emitting diode light string through the serial connection wire, the feedback line is electrically connected between the plurality of light-emitting diode modules and the controller, and the plurality of keys correspond to the light-emitting diode modules and are electrically connected to the feedback line, wherein each of the plurality of keys has a pressing state and a non-pressing state; the control method comprises the following steps:

step 1, transferring a light-emitting signal and a discriminating signal to the light-emitting diode light string through the serial connection wire by the controller, wherein the light-emitting signal is not be equivalent to the discriminating signal;

step 2, emitting light by each of the plurality of light-emitting diode modules of the light-emitting diode light string according to the light-emitting signal after receiving the light-emitting signal;

step 3, outputting a feedback signal by each of the plurality of light-emitting diode modules of the light-emitting diode light string after receiving the discriminating signal and transfers the feedback signal to the controller through the feedback line; and step 4, when at least one of the plurality of keys is switched to the pressing state from the non-pressing state, pulling the feedback signal from a first level to a second level for the controller to differentiate the key in the pressing state.

5. The control method of claim 4, wherein the controller differentiates the key in the pressing state according to a time receiving the feedback signal.

6. The control method of claim 4, wherein the light-emitting signal and the discriminating signal are electric signals with different pulse widths.

7. The control method of claim 4, wherein a switch is formed between each of the plurality of keys and the feedback line, is turned on when the key is in the pressing state and is turned off when the key is in the non-pressing state.

* * * * *